Feb. 11, 1969 L. J. SEVIN 3,426,662
MOVIE CAMERA IRIS CONTROL DEVICE
Filed June 30, 1966

INVENTOR:
LEONCE J. SEVIN

E. Mickey Hubbard
ATTORNEY

３,426,662
Patented Feb. 11, 1969

3,426,662
MOVIE CAMERA IRIS CONTROL DEVICE
Leonce J. Sevin, Richardson, Tex., assignor to Texas Instruments Incorporated, Dallas, Tex., a corporation of Delaware
Filed June 30, 1966, Ser. No. 561,945
U.S. Cl. 95—10          5 Claims
Int. Cl. G01j *1/00, 1/52;* G03b *7/08*

This invention relates generally to photography, and more particularly relates to an improved circuit device for automatically controlling the iris setting of a movie camera or the like and thereby provide the proper light level for exposing the film.

Most motion picture cameras, as well as most still cameras, now have an automatic control of some type. These controls automatically adjust the diameter of the iris so that the precise amount of light necessary for proper exposure of the film is permitted to pass through the lens and strike the film. These iris controls are effective to varying degrees, but in general are too slow for good movie camera operation, and tend to have calibration errors over varying temperature ranges and varying voltage supply ranges.

The principal object of this invention is to provide an improved automatic iris control for a movie camera or the like.

Another object is to provide such a device which responds to changes in light level at a high rate of speed.

Another object of the invention is to provide such a device having a push-pull switching output which rapidly and efficiently drives a servomotor controlling the iris of the camera.

Still another object is to provide such a device which has a stable operation over a significant variation in voltage supply and over a significant temperature range.

Another object is to provide such a device which is easily calibrated.

A further object is to provide such a device which can be fabricated in integrated circuit form and therefore at a low unit cost.

These and other objects are accomplished in accordance with the present invention by utilizing a high gain differential amplifier having first and second inputs and first and second outputs. The first output of the differential amplifier is connected to drive the base of a first output switching transistor means, and the second output is connected to drive the base of a second output switching transistor means. A bidirectional motor is provided to drive the iris of the camera. The motor has first and second windings which are driven by the first and second output switching transistor means. The output of the first output switching transistor means is capacitively coupled by a first capacitor back to the second input of the amplifier, and the output of the second output switching transistor means is capacitively coupled back to the first input of the amplifier by a second capacitor. A calibration current source is connected to charge one of the capacitors in a fixed, but selectable period, and a photodiode is connected to charge the other over a period of time to the incident light on the photodiode. As a result of the capacitively coupled feed-back loops to the first and second inputs and the inductance provided by the motor, the circuit is an astable, duty cycle modulated multi-vibrator. The period of time that the first output is turned "on" is constant depending upon the setting of the calibration current source, while the period of time that the second output is turned "on" is related to the incident light falling upon the photodiode. Thus, as the incident light on the diode rises and falls, the average net current to the motor is such that the motor is rotated in a direction to change the iris setting and maintain a constant light level on the diode and therefore on the film.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

Figure 1:
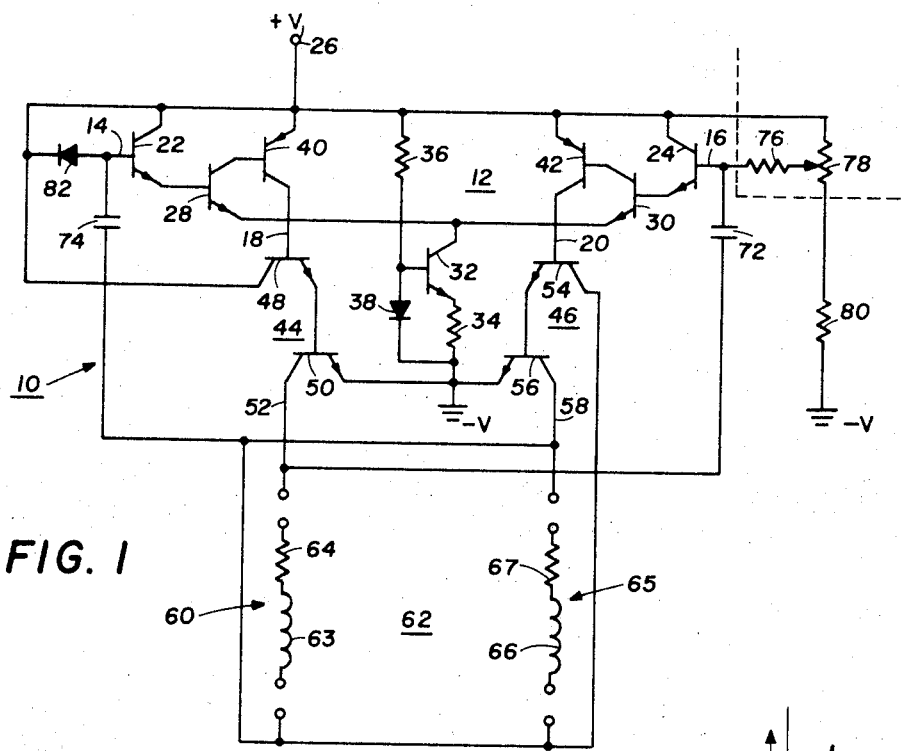
FIGURE 1 is a schematic circuit diagram of a device constructed in accordance with the present invention.

Referring now to the drawings, a circuit constructed in accordance with the present invention is indicated generally by the reference numeral 10. The circuit 10 is comprised of a high gain differential amplifier, indicated generally by the reference numeral 12, having first and second inputs 14 and 16 and first and second outputs 18 and 20. More specifically, the differential amplifier has a first pair of input transistors 22 and 24. The bases of transistors 22 and 24 are connected to the inputs 14 and 16, the collectors are connected to a voltage supply terminal 26, and the emitters drive the bases of second stage amplifiers 28 and 30, respectively. The emitters of transistors 28 and 30 are connected through transistor 32 and resistor 34 to ground. The base of the transistor 32 is connected through resistor 36 to the voltage supply terminal, and by forward biased diode 38 to ground, and therefore provides a constant current source for the emitters of transistors 28 and 30. The collectors of transistors 28 and 30 drive the bases of output transistors 40 and 42. The emitters of transistors 40 and 42 are connected to the voltage supply terminal 26, and the collectors form the outputs 18 and 20.

The outputs 18 and 20 of the amplifier 12 are connected to drive output switching transistor means indicated generally by the reference numerals 44 and 46, respectively. More particularly, output 18 is connected to drive the base of a transistor 48. The collector of transistor 48 is connected to the voltage supply terminal 26, and the emitter drives the base of a second transistor 50. The emitter of transistor 50 is connected to ground while the collector forms the output 52 of the first transistor switching means 44. Similarly, the output 20 is connected to drive the base of a transistor 54. The collector of transistor 54 is connected to the voltage supply terminal 26, and the emitter is connected to drive the base of a transistor 56. The emitter of transistor 56 is connected to ground, and the collector forms the output 58 of the second transistor switch means 46. Thus, the first and second transistor switching means 44 and 46 are connected in push-pull configuration. The output 52 is connected to one terminal of one winding 60 of a motor 62, the winding being represented by the inductor 63 and the resistor 64. The other terminal is connected to the voltage supply terminal 26. The output 58 of the other transistor switching means 46 is connected through the other winding 65 of the motor 62 to the voltage supply terminal 26, the winding being represented by an inductor 66 and a resistance 67. Current through the first winding 60 drives the motor in a direction to increase the iris opening and thereby increase the light through the iris, while current through winding 65 drives the motor in the other direction so as to reduce the iris opening and reduce the light passing through the iris.

Figure 2:
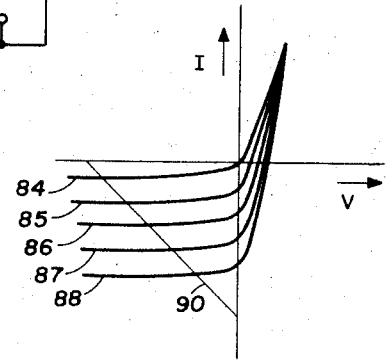
FIGURE 2 is a current and voltage plot of a family of curves illustrating the operation of the photodiode used in the circuit of FIGURE 1.

The output 52 of the first transistor switching means 44 is connected by a first capacitor 72 back to the second input 16, while the output 58 of the second transistor switching means 46 is connected back through a second capacitor 74 to the first input 14. A calibration current source is provided to charge the first capacitor 72 and is comprised of a large resistor 76 which is connected to the sliding contact of a variable resistor 78. One terminal of the variable resistor 78 is connected to the voltage supply 26, and the other is connected through a resistor 80 to ground. The network of resistors thus provides a current for charging capacitors in a fixed period that is selectively variable by adjustment of resistor 78 for calibration purposes which will hereafter become more evident. Thus the resistor network performs the same function as a selectively variable constant current source. A photodiode 82 is connected between the input 14 and the voltage supply terminal 26 in a direction to be reverse biased. The operation of the diode 82 is indicated generally by the family of curves 84–88 and the load line 90 in FIGURE 2. The curves 84–88 represent the current through the reverse biased diode when the diode is subjected to increasing intensities of incident light, and the load line 90 specifies the voltage drop across the diode 82 at the various current levels. The photodiode 82 thus provides a variable current source for charging the capacitor 74 that is directly proportional to the incident light on the diode.

As a result of the feedback capacitors 72 and 74 and the inductive nature of the motor windings 60 and 65, the circuit described is astable. Since the capacitors 72 and 74 constitute a regenerative switching path, the outputs 18 and 20 of the differential amplifier 12 are alternately switched first from a high level to a low level so that the transistors 50 and 56 of the switching means 44 and 46 are abruptly switched, in the alternative, from "off" to saturation, thus switching current alternately through windings 60 and 65 of the motor 62. The period during which current passes through winding 60 is herein designated as period I, and the period during which current passes through winding 65 is designated period II. Period I is determined by the period of time required for the current through resistor 76 to charge capacitor 72 so that transistors 24, 30, 42, 54 and 56 can be turned "on." This period remains constant because of the constant average current through resistor 76. On the other hand, period II is determined by the time required for current through photodiode 82 to charge capacitor 74 to a level sufficient for the current to turn transistors 22, 28, 40, 48 and 50 "on."

Figure 3A:
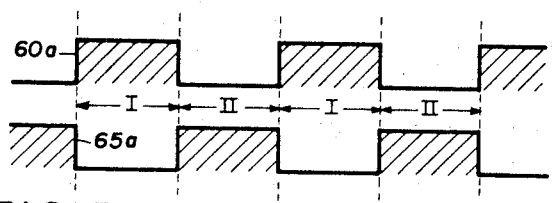
FIGURES 3a, 3b and 3c are plots of the current, with respect to time, passing through the two windings of the motor of the circuit of FIGURE 1 and illustrate the three operating conditions of the circuit.

FIGURE 3a represents the condition when period II is equal to period I. Then the average current through winding 60, as represented by curve 60a, is equal to the average current through winding 65, as represented by curve 65a, and the motor 62 does not rotate. This is, therefore, the null or calibration condition which determines the level of light falling on the photodiode 82 and therefore the film. The calibration condition is achieved by adjusting resistor 78 until the desired light level is passing through the iris of the camera and therefore striking the photodiode.

Figure 3B:
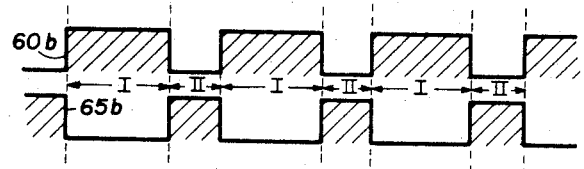

When the incident light on diode 82 increases, period II is decreased as illustrated by curves 60b and 65b in FIGURE 3b. As a result, the average current through winding 60 exceeds the average current through winding 65, and the motor 62 rotates in a direction to decrease the iris opening and thereby decrease the light falling on diode 82 until period I is again equal to period II.

Figure 3C:
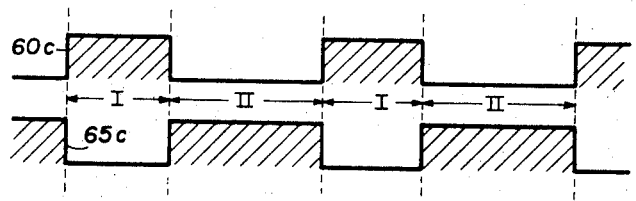

On the other hand, if the light falling on the photodiode 82 decreases, period II will increase, as indicated by curves 60c and 65c in FIGURE 3c, so that the average current flowing through winding 65 exceeds the average current through winding 60. Then the motor 62 will rotate in a direction to open the iris and increase the light falling on the diode 82 until the periods are again equal. In this manner, the light intensity reaching the film is maintained at a constant level.

The temperature stability of the circuit 10 depends upon the values of the current to the bases of transistors 22 and 24. These currents cause the circuit to switch and are small compared to the currents through the photodiode 82 and through resistor 76, respectively. The time at which the circuit switches depends upon the current level at which the overall loop gain of the circuit exceeds unity. If the two sides of the differential amplifier are identical, it does not matter if the current through the photodiode 82 and the current through resistor 76 are different. The nature of the inductive loads insures that the transient gain is much higher than the D.C. gain, allowing both sides of the amplifier to switch at approximately the same current level.

An important aspect of the invention is that the circuit can be fabricated on a single silicon bar, including the photodiode. The only external components would be the calibration resistor 78 and the large resistor 76 which provide the constant current source to charge capacitor 72. The circuit contains only two resistors and eleven transistors, and only two of the transistors need by very large. The feedback capacitor 74 is typically about 5 picofarads, while capacitor 72 is typically about 75 picofarads, so that these capacitors may be merely p-n junctions in the monolithic circuit.

The same number of transistor $V_{BE}$'s are present on both sides of the differential amplifier to provide drift cancellation. $V_{BE}$ drift cancellation hinges on the fact that the change in the $V_{BE}$ values with respect to a change in temperature depends mainly on the $V_{BE}$ values, so the equal $V_{BE}$ values result in no differential drift. Since the $V_{BE}$ of a transistor varies as the natural logarithm of the emitter current, reasonable differences in the switching currents to the bases of transistor 22 and 24 do not appreciably affect the differential $V_{BE}$ drift.

The constant current supplied by transistor 32 may be eliminated if desired, in which case the emitters of transistors 28 and 30 would merely be connected through the resistor 34 to ground, without disrupting the basic operation of the circuit or without excessively degrading the performance of the circuit.

The iris control device disclosed above has a very rapid response suitable for use in a movie camera, as well as a still camera, and is stable over a wide temperature range and wide voltage supply range. The circuit has a minimum of components utilizing the windings of the motor to achieve oscillation, and can be fabricated essentially on a single silicon chip at a low cost. Although the device 10 utilizes NPN transistors because that type of transistor is more easily fabricated in integrated circuit form, it is to be understood that the same circuit can be formed from PNP transistors merely by reversing the polarities in a manner well known in the art. In view of the difficulty of drafting claims which will read on both types of transistors, it is to be understood that the two types of transistors are considered as equivalent in the appended claims.

Although a preferred embodiment of the invention has been described in detail, it is to be understood that various changes, substitutions and alterations can be made therein without departing from the spirit and scope of the invention as defined by the appended claims.

What is claimed is:

1. In an automatic iris control for a camera having a bidirectional motor for operating the iris of the camera, the motor having first and second windings and being adapted to close the iris during a period when the average current through the first winding exceeds the average current through the second winding, and to close the iris when the average current through the second winding exceeds the average current through the first winding, the combination of:

a high gain differential amplifier having first and second inputs and first and second outputs, first switching means having an output transistor the base current of which is derived from the first output of the amplifier, the collector of the output transistor being the output of the first switching means and being connected through the first winding of the motor to a power supply, and the emitter being connected to ground, second switching means having an output transistor the base current of which is derived from the second output of the amplifier, the collector of the output transistor being the output of the second switching means and being connected through the second winding of the motor to the power supply, and the emitter being connected to ground, a first capacitor coupling the output of the first switching means to the second input of the amplifier, a second capacitor coupling the output of the second switching means to the first input of the amplifier, a current source connected to the second input of the amplifier for charging the first capacitor in a preselected, fixed period of time, and a photodiode connected to the first input of the amplifier for charging the second capacitor with a current directly related to the incident light on the photodiode, whereby the amplifier will be astable and will oscillate as a result of the inductive load provided by the windings of the motor and the capacitors cross-coupling the outputs of the switching means to the inputs of the amplifier, and the period of time current passes through the first winding will be constant while the period of time current passes through the second winding will be inversely related to the incident light on the photodiode.

2. The combination defined in claim 1 wherein the photodiode, amplifier and switching means are formed on a common monolithic substrate.

3. The combination defined in claim 1 wherein the amplifier comprises first and second input transistors the bases of which are the first and second inputs, respectively, of the amplifier, the collectors of which are connected to the power supply and the emitters of which drive the bases of first and second second-stage transistors the emitters of which are common and are connected to ground and the collectors of which are connected to drive the bases of first and second third-stage transistors, the emitters of the third-stage transistors being connected to the power supply and the collectors being connected to drive the bases of first and second amplifier output transistors, respectively, the collectors of the output transistors being connected to the power supply and the emitters constituting the first and second outputs of the amplifier, respectively.

4. The combination defined in claim 3 wherein each of the switching means comprises an input transistor the base of which forms the input of the switching means and is connected to the respective output of the amplifier and the emitter of which is connected to drive the base of the output transistor.

5. In an automatic iris control for a camera having a bidirectional motor for operating the iris of the camera, the motor having first and second windings and being adapted to close the iris during a period when the average current through the first winding exceeds the average current through the second winding, and for closing the iris when the average current through the second winding exceeds the average current through the first winding, the combination of:

a high gain differential amplifier means having first and second inputs and first and second switching outputs, first and second capacitors coupling the first and second inputs to the output that is inverted to the respective input, the output that is inverted to the first input being connectable to the second winding of the motor and the output that is inverted to the second input being connectable to the first winding of the motor, a selectively variable current source connected to the second input for charging the second capacitor in a selectable fixed period, and a photodiode connected to the first input for charging the first capacitor with a current directly related to the incident light on the photodiode, whereby the amplifier will be astable and will oscillate as a result of the inductive load provided by the windings of the motor and the first and second capacitors, and the period of time current passes through the first winding will be constant while the period of time current passes through the second winding will be inversely related to the incident light on the photodiode.

References Cited

UNITED STATES PATENTS

| 2,885,471 | 5/1959 | King | 352—141 XR |
| 2,956,492 | 10/1960 | Quick | 95—64 |
| 3,003,096 | 10/1961 | Du Bois | 318—20 |
| 3,004,199 | 10/1961 | Sakson | 318—20 |
| 3,079,539 | 2/1963 | Guerth | 318—20 |
| 3,143,054 | 8/1964 | Ploke et al. | 95—64 |
| 3,313,224 | 4/1967 | Biederman | 95—64 |

NORTON ANSHER, *Primary Examiner.*

J. F. PETERS, JR., *Assistant Examiner.*

U.S. Cl. X.R.

95—64; 250—210; 317—124; 318—18, 28; 352—141